US010899409B2

(12) United States Patent
Koyama et al.

(10) Patent No.: US 10,899,409 B2
(45) Date of Patent: Jan. 26, 2021

(54) SADDLED VEHICLE

(71) Applicant: HONDA MOTOR CO., LTD., Tokyo (JP)

(72) Inventors: Shinya Koyama, Wako (JP); Akinobu Masunaga, Wako (JP); Yoshiaki Nakashima, Wako (JP); Makoto Hotozuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/363,443

(22) Filed: Mar. 25, 2019

(65) Prior Publication Data

US 2019/0300091 A1  Oct. 3, 2019

(30) Foreign Application Priority Data

Mar. 30, 2018  (JP) ................. 2018-068091

(51) Int. Cl.
*B62J 37/00* (2006.01)
*B62J 35/00* (2006.01)
*B62K 19/32* (2006.01)
*B62K 5/01* (2013.01)

(52) U.S. Cl.
CPC ............ *B62J 37/00* (2013.01); *B62J 35/00* (2013.01); *B62K 19/32* (2013.01); *B62K 5/01* (2013.01)

(58) Field of Classification Search
CPC .......... B62J 37/00; B62J 35/00; B62K 19/32; B62K 5/01
See application file for complete search history.

(56) References Cited

U.S. PATENT DOCUMENTS

| | | | | |
|---|---|---|---|---|
| 6,029,635 | A * | 2/2000 | Sekine | B60K 15/035 123/516 |
| 6,354,280 | B1 * | 3/2002 | Itakura | B60K 15/03504 123/198 D |
| 7,438,058 | B2 * | 10/2008 | Ito | F02M 25/0872 123/518 |

(Continued)

FOREIGN PATENT DOCUMENTS

| | | |
|---|---|---|
| JP | 2013-67275 A | 4/2013 |
| JP | 2017-65413 A | 4/2017 |
| JP | 6145486 B2 | 6/2017 |

OTHER PUBLICATIONS

Japanese Office Action for Japanese Application No. 2018-068091, dated Oct. 30, 2019, with an English translation.

(Continued)

*Primary Examiner* — Erez Gurari
(74) *Attorney, Agent, or Firm* — Birch, Stewart, Kolasch & Birch, LLP

(57) ABSTRACT

A saddled vehicle includes: a vehicle body frame; an internal combustion engine supported at a lower portion of the vehicle body frame; a fuel tank supported at an upper portion of the vehicle body frame; and a canister. The canister is disposed around the fuel tank at a position lower than a seating portion of an occupant seat. A removable hermetic sealing cap or a one-way valve that prevents entry of rainwater from an outside is included in a drain pipe disposed at a lower portion of the canister. Accordingly, entry of rainwater into the canister is prevented with a simple structure.

5 Claims, 7 Drawing Sheets

(56) References Cited

U.S. PATENT DOCUMENTS

| | | | | |
|---|---|---|---|---|
| 8,726,888 | B2* | 5/2014 | Yoshida | B62J 37/00 |
| | | | | 123/519 |
| 9,592,873 | B2* | 3/2017 | Tsubone | F02M 35/162 |
| 9,765,731 | B2* | 9/2017 | Okubo | F02M 25/06 |
| 9,988,121 | B2* | 6/2018 | Inomata | B62J 37/00 |
| 10,131,396 | B2* | 11/2018 | Yasuta | B62J 15/00 |
| 10,315,511 | B2* | 6/2019 | Hayashi | B60K 15/063 |
| 2012/0247862 | A1* | 10/2012 | Nishimura | B62K 11/04 |
| | | | | 180/299 |
| 2016/0137249 | A1* | 5/2016 | Sasage | B62K 21/12 |
| | | | | 180/219 |
| 2017/0089303 | A1* | 3/2017 | Kurata | B60K 15/073 |
| 2019/0299773 | A1* | 10/2019 | Kobayashi | B62J 37/00 |
| 2019/0300091 | A1* | 10/2019 | Koyama | B62K 19/32 |
| 2019/0300094 | A1* | 10/2019 | Kurata | B62J 15/00 |

OTHER PUBLICATIONS

English Machine translation for JP 56-83588 U dated Jul. 6, 1981, pp. 1-4.
English Machine translation for JP 60-36566 U dated Mar. 13, 1985, pp. 1-5.

* cited by examiner

SADDLED VEHICLE

CROSS REFERENCE TO RELATED APPLICATIONS

The present application claims priority under 35 U.S.C. § 119 to Japanese Patent Application No. 2018-68091 filed Mar. 30, 2018 the entire contents of which are hereby incorporated by reference.

BACKGROUND OF THE INVENTION

Field of the Invention

The present invention relates to a saddled vehicle comprising: a vehicle body frame that includes a head pipe, disposed at a front end portion of the vehicle body frame, for steerably supporting a steering handlebar; an internal combustion engine supported at a lower portion of the vehicle body frame; a fuel tank supported at an upper portion of the vehicle body frame; and a canister that, while adsorbing fuel vapor generated in the fuel tank, can purge the fuel vapor to an intake system of the internal combustion engine.

Description of the Related Art

Japanese Patent No. 6145486 discloses a saddled vehicle in which a canister that adsorbs fuel vapor generated in a fuel tank is disposed between the fuel tank and an internal combustion engine as seen in a side view.

SUMMARY OF THE INVENTION

The configuration disclosed in Japanese Patent No. 6145486 can achieve a shorter length of canister-related piping because of the canister disposed close to the fuel tank and the internal combustion engine. Because the canister has a drain structure, however, a need can exist for prevention of rainwater entry into the canister by way of a drain port depending on how the vehicle is used.

The present invention has been achieved in view of the above-mentioned circumstance and it is an object thereof to provide a saddled vehicle that can prevent entry of rainwater into the canister, with a simple structure.

In order to achieve the object, according to a first aspect of the present invention, there is provided a saddled vehicle comprising: a vehicle body frame that includes a head pipe, disposed at a front end portion of the vehicle body frame, for steerably supporting a steering handlebar; an internal combustion engine supported at a lower portion of the vehicle body frame; a fuel tank supported at an upper portion of the vehicle body frame; and a canister that, while adsorbing, fuel vapor generated in the fuel tank, can purge the fuel vapor to an intake system of the internal combustion engine, the canister being disposed around the fuel tank at a position lower than a seating portion of an occupant seat, wherein the saddled vehicle further comprises: a removable hermetic sealing cap or a one-way valve that prevents entry of rainwater from an outside, the hermetic sealing cap or the one-way valve being included in a drain pipe disposed at a lower portion of the canister.

With the first aspect, the canister is disposed around the fuel tank at a position lower than the seating portion of the occupant seat. Thus, despite the canister being disposed at a position relatively lower in height, entry of rainwater in the canister can be prevented by a simple structure in which the removable hermetic sealing cap or the one-way valve is mounted in the drain pipe of the canister.

According to a second aspect of the present invention, in addition to the first aspect, an outside air introduction pipe is provided at the canister and prevents purge resistance from increasing as a result of vacuum developing inside the canister during purging of the fuel vapor to the intake system, and an outside air introduction hose connected with the outside air introduction pipe has an upstream opening end portion disposed at a position higher than the seating portion of the occupant seat.

With the second aspect, the outside air introduction hose connected with the outside air introduction pipe of the canister has the upstream opening end portion disposed at a position higher than the seating portion of the occupant seat. Thus, even when the vehicle is used to travel down a flooded road with a deep water depth, the upstream opening end portion of the outside air introduction hose can be disposed at a position higher than the water level, so that steady introduction of outside air to the canister can be achieved and purge performance of the canister can be enhanced.

According to a third aspect of the present invention, in addition to the second aspect, an exhaust muffler that configures a downstream end portion of an exhaust system of the internal combustion engine is disposed below the occupant seat, the canister is disposed below a lower end of an exhaust outlet of the exhaust muffler, and the upstream opening end portion of the outside air introduction hose is disposed at a position higher than the seating portion of the occupant seat.

With the third aspect, even with the configuration in which the canister is disposed at an even lower position by being disposed below the lower end of the exhaust outlet of the exhaust muffler that is disposed below the occupant seat, the outside air introduction hose has the upstream opening end portion disposed at a high position, so that steady introduction of outside air to the canister can be achieved and purge performance of the canister can be enhanced.

According to a fourth aspect of the present invention, in addition to the second or third aspect, the upstream opening end portion of the outside air introduction hose is disposed around a fuel filler port disposed in an upper portion of the fuel tank.

With the fourth aspect, the upstream opening end portion of the outside air introduction hose is disposed around the fuel filler port that is disposed in the upper portion of the fuel tank. Thus, entry of dust in the fuel filler port and the upstream opening end portion of the outside air introduction hose can be prevented, so that dust-proof performance can be enhanced, while a dust-proof structure for the upstream opening end portion of the outside air introduction hose can be further simplified.

In order to achieve the object, according to a fifth aspect of the present invention, there is provided a saddled vehicle comprising: a vehicle body frame that includes a head pipe, disposed at a front end portion of the vehicle body frame, for steerably supporting a steering handlebar; an internal combustion engine supported at a lower portion of the vehicle body frame; a fuel tank supported at an upper portion of the vehicle body frame; and a canister that, while adsorbing fuel vapor generated in the fuel tank, can purge the fuel vapor to an intake system of the internal combustion engine, the canister being disposed above a lower end of an exhaust outlet of an exhaust muffler that configures a downstream end portion of an exhaust system of the internal combustion engine, wherein the saddled vehicle further comprises: a drain pipe disposed at a lower portion of the canister, the drain pipe being opened directly to an outside while facing downwardly.

With the fifth aspect, the canister is disposed above the lower end of the exhaust outlet of the exhaust muffler and the drain pipe at the lower portion of the canister is opened directly to the outside while facing downwardly. The disposition of the canister at a position relatively high can avoid rainwater from scattering toward the drain pipe side and a simple structure by which the drain pipe is opened directly to the outside while facing downwardly can prevent rainwater from entering the canister.

According to a sixth aspect of the present invention, in addition to the fifth aspect, an outside air introduction pipe is provided at the canister and prevents purge resistance from increasing as a result of vacuum developing inside the canister during purging of the fuel vapor to the intake system, and a charge hose and an outside air introduction hose are disposed so as to cross each other at a position beside the canister, the charge hose guiding fuel vapor from the fuel tank to the canister, and the outside air introduction hose being connected to the outside air introduction pipe.

With the sixth aspect, the charge hose and the outside air introduction hose connected to the outside air introduction pipe of the canister are disposed so as to cross each other at a position beside the canister. The resultant longer length in the charge hose and the outside air introduction hose allows the outside air and the fuel vapor to flow mildly, so that variations in pressure inside the canister can be suppressed and steady emission performance can be maintained.

According to a seventh aspect of the present invention, in addition to the fifth or sixth aspect, the canister is supported by the vehicle body frame so that a longitudinal direction of the canister extends along a vehicle fore-aft direction, the canister being disposed on one side in a vehicle width direction of the vehicle body frame and below the fuel tank, and the drain pipe is disposed on an end wall of the canister, the end wall facing rearwardly in the vehicle fore-aft direction.

With the seventh aspect, the drain pipe is disposed on the end wall, which faces toward the rear in the vehicle fore-aft direction, of the canister that has a longitudinal direction extending in the vehicle fore-aft direction. An effect can thus be enhanced of prevention of entry of dust, dirt, muddy water, and the like, which can scatter as the vehicle travels, in the drain pipe.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Embodiments of the present invention will be described below with reference to FIGS. 1 to 7. Throughout the descriptions given hereunder, expressions indicating directions including up and down, front and rear, and right and left mean the same directions as viewed from an occupant riding in an all-terrain vehicle.

Figure 1:
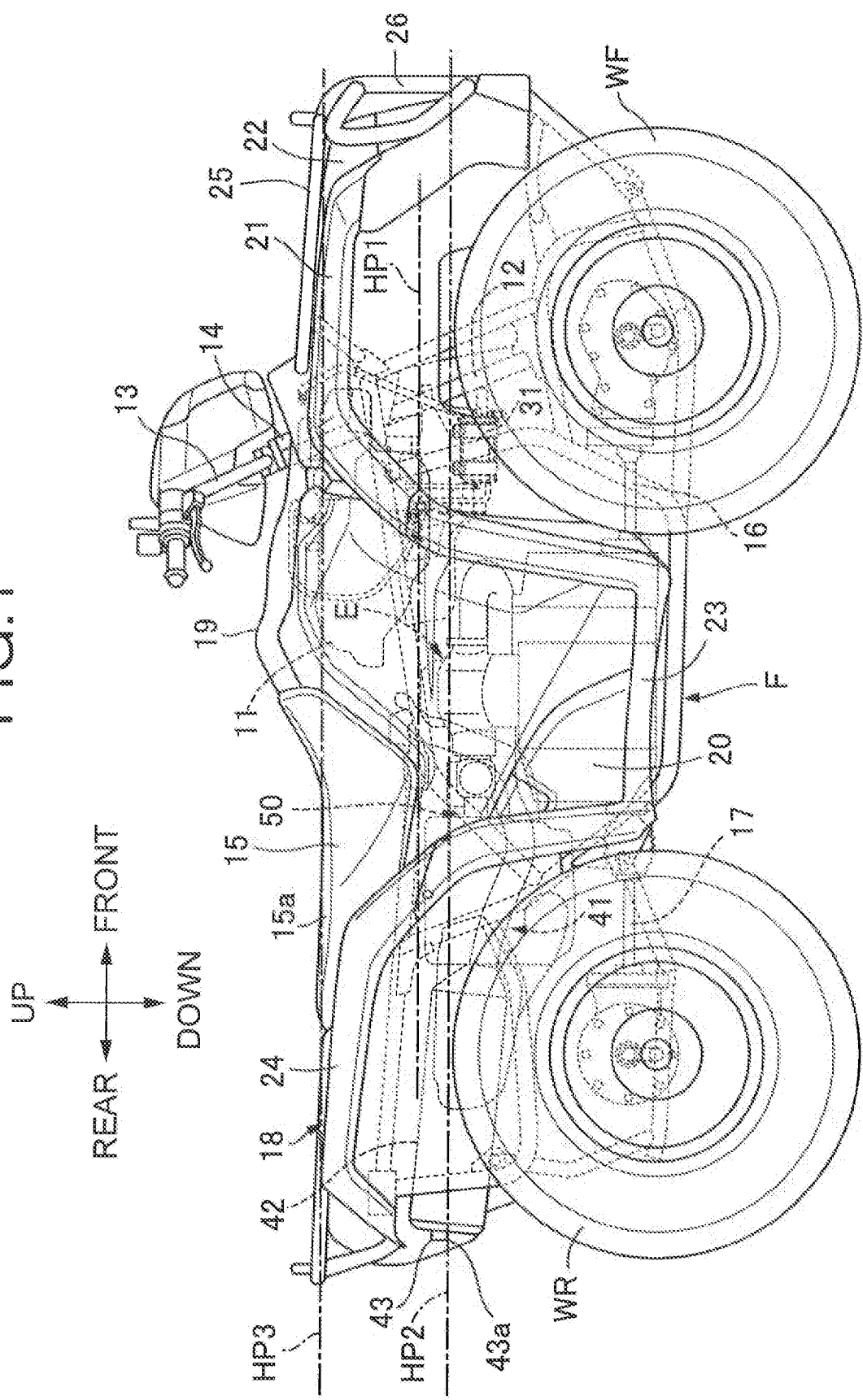
FIG. 1 is a right side view of a saddled vehicle according to a first embodiment of the present invention.
Figure 2:
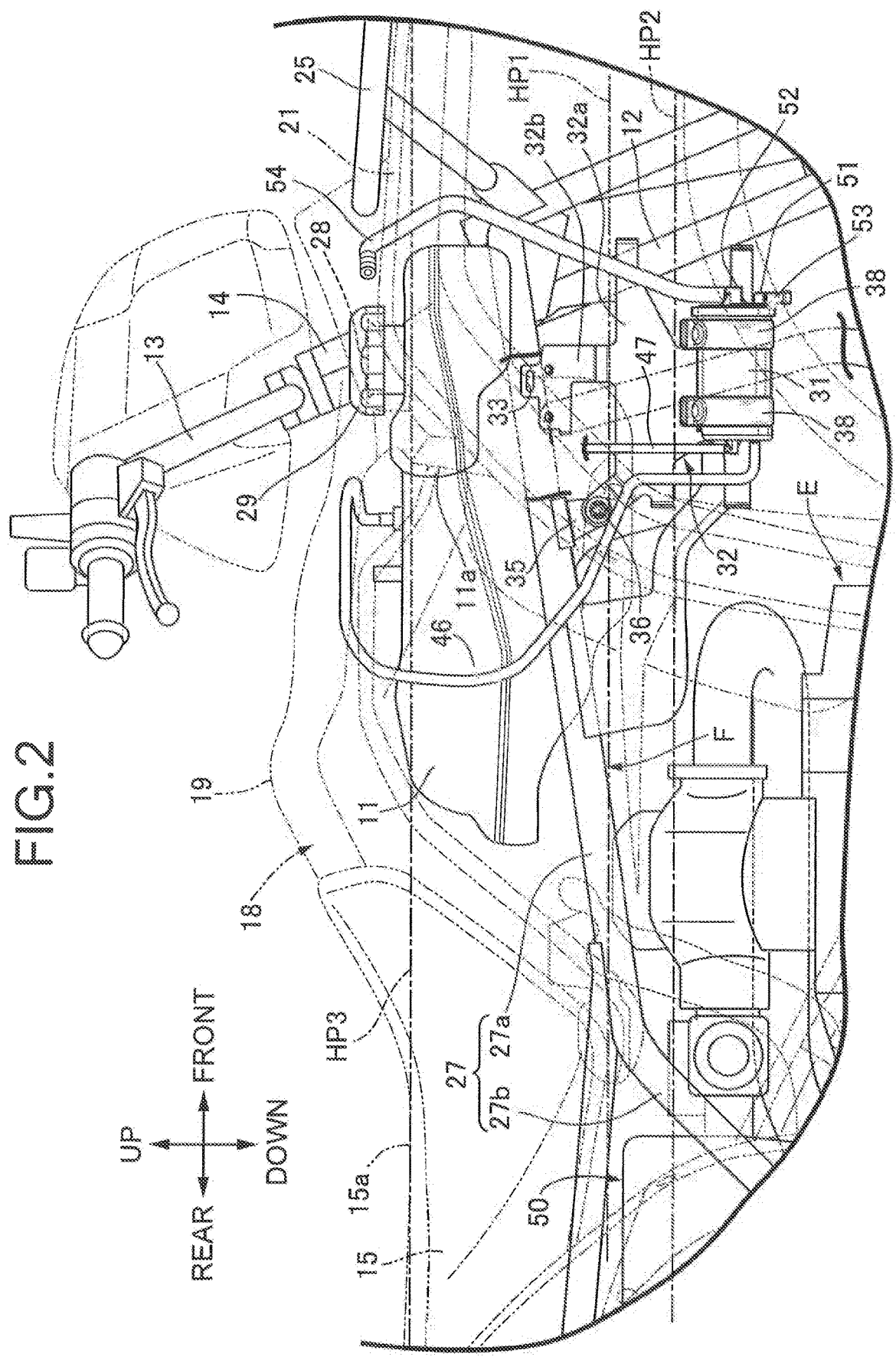
FIG. 2 is a right side view of a major part for the saddled vehicle under a condition in which a vehicle body cover has been removed.
Figure 3:
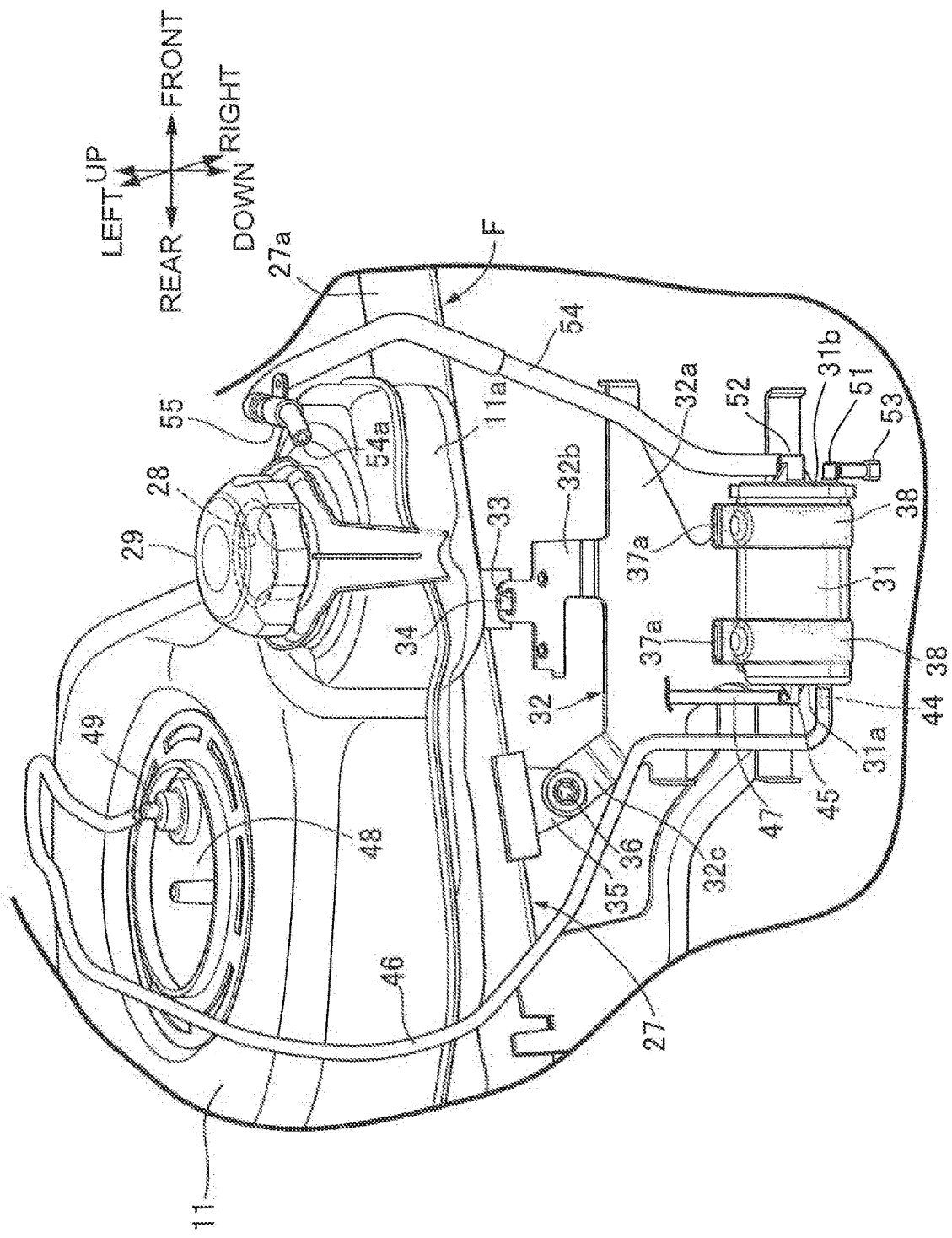
FIG. 3 is a perspective view of the major part in FIG. 2.

A first embodiment of the present invention will be described below with reference to FIGS. 1 to 5. Reference is made to FIGS. 1 to 3. The saddled vehicle is an all-terrain vehicle including a vehicle body frame F. The vehicle body frame F is formed of a plurality of frame members welded and coupled with each other, the frame members including a plurality of metal pipes. An internal combustion engine E and a fuel tank 11 are mounted on the vehicle body frame F. The fuel tank 11 stores fuel to be supplied to the internal combustion engine E and is disposed above the internal combustion engine E.

Reference is also made to FIG. 2. A pair of left and right front wheels WF is suspended at a front portion of the vehicle body frame F via independent front suspensions (not illustrated). A pair of left and right rear wheels WR is suspended at a rear portion of the vehicle body frame F via independent rear suspensions (not illustrated).

A head pipe 14 is disposed at a front end portion of the vehicle body frame F. A steering shaft 12, which is inclined upwardly toward the rear, is rotatably supported on the head pipe 14. A bar-shaped steering handlebar 13 is mounted on au upper end portion of the steering shaft 12. The steering handlebar 13 is operated to steer the left and right front wheels WF.

The internal combustion engine E is mounted on a lower portion of the vehicle body frame F so as to be disposed behind the steering shaft 12 and the steering handlebar 13. The fuel tank 11, which is disposed above the internal combustion engine E, is supported at an upper portion of the vehicle body frame F. In addition, an occupant seat 15 is disposed above the internal combustion engine E and behind the fuel tank 11 and supported on the vehicle body frame F.

The internal combustion engine E develops power for driving the pair of left and right front wheels WF and the pair of left and right rear wheels WR. A front-portion drive shaft 16, which drives the pair of left and right front wheels WF, is extended from the internal combustion engine E toward the front. A rear-portion drive shaft 17, which drives the pair of left and right rear wheels WR, is extended from the internal combustion engine E toward the rear.

The vehicle body frame F, the fuel tank 11, the internal combustion engine E, the front wheels WF, and the rear wheels WR are covered in a vehicle body cover 18. The vehicle body cover 18 includes a tank cover 19, a pair of left and right side covers 20, a pair of left and right front fenders 21, a front cover 22, a pair of left and right steps 23, and a pair of left and right rear fenders 24. The tank cover 19 covers the fuel tank 11 from above. The side covers 20 are joined to respective lateral sides of the tank cover 19 to thereby be disposed at positions at which the side covers 20 cover the internal combustion engine E from respective sides. The front fenders 21 are disposed at positions at which the front fenders 21 cover the respective front wheels WF. The front cover 22 is disposed at a position at which the front cover 22 connects between the front fenders 21. The steps 23 are connected with lower end portions of the side covers 20 and with rear end lower portions of the front fenders 21 so as to allow the occupant sitting in the occupant seat 15 to rest his or her feet on the steps 23. The rear fenders 24 are joined to respective rear end portions of the side covers 20 and to respective rear end portions of the steps 23 to thereby be disposed at positions at which the rear fenders 24 cover the respective rear wheels WR.

A front carrier 25 is disposed at the front portions of the front fenders 21 and above the front cover 22. The front carrier 25 is connected with a front protector 26. The front protector 26 is mounted at the front end portion of the vehicle body frame F so as to cover the front fenders 21 and the front cover 22 from the front.

The fuel tank 11 is supported by a pair of left and right frame members 27. The frame members 27 configure a part of a front portion of the vehicle body frame F. The frame members 27 each include a front-portion inclined portion 27a and a rear-portion inclined portion 27b. The front-portion inclined portion 27a is inclined downwardly toward the rear. The rear-portion inclined portion 27b is joined integrally to a rear end of the front-portion inclined portion 27a at an angle steeper than the inclination of the front-portion inclined portion 27a. The fuel tank 11 is supported on the front-portion inclined portions 27a of the frame members 27.

Figure 4:
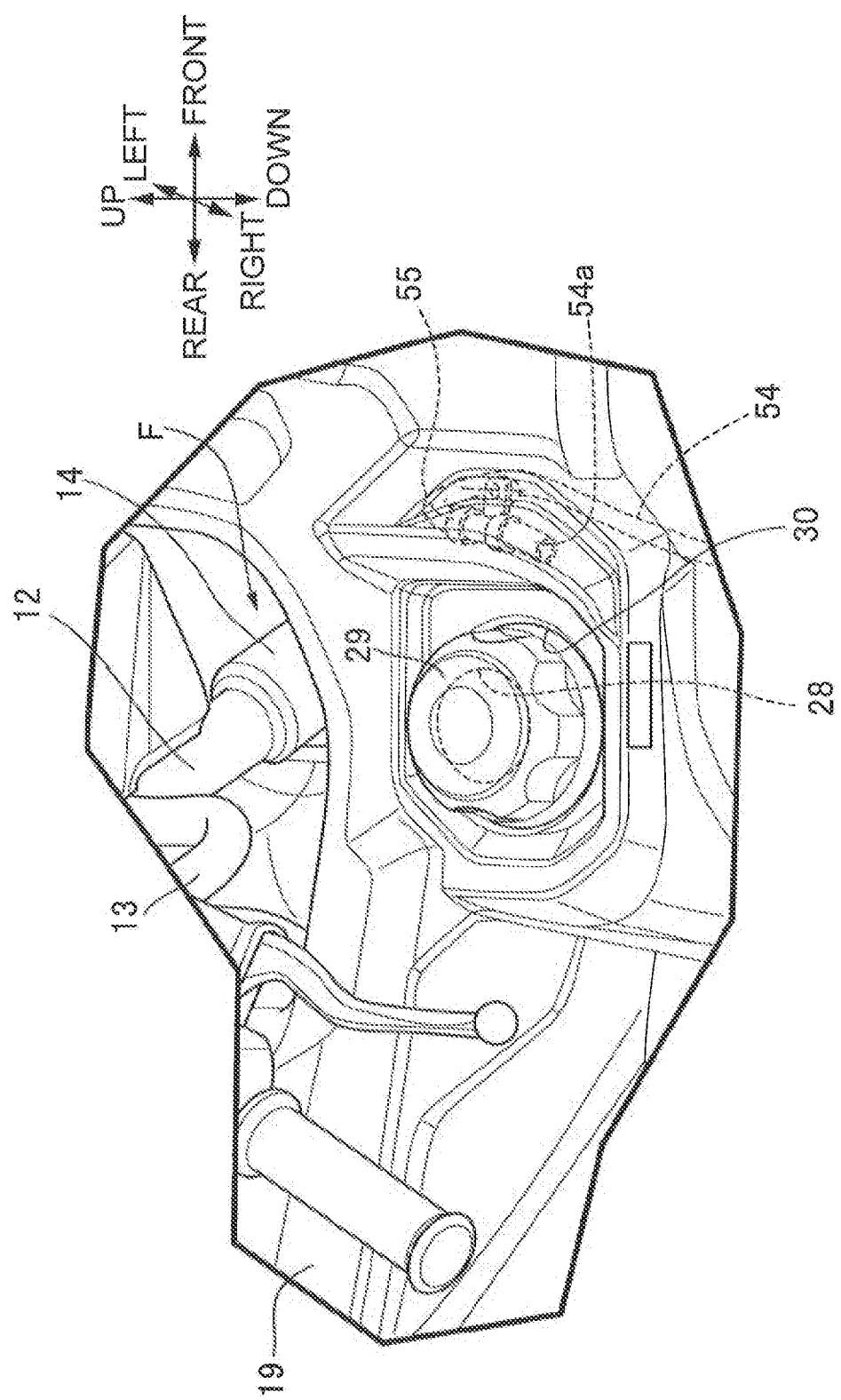
FIG. 4 is a perspective view of a fuel filler port and its vicinity.

Reference is also made to FIGS. 3 and 4. The fuel tank 11 has a bulge 11a integrated therewith. The bulge 11a is located on the right at a front portion of the fuel tank 11 in a vehicle fore-aft direction so as to bulge toward the right from above the front-portion inclined portion 27a of the frame member 27 on the right in a vehicle width direction of the frame members 27. A fuel filler port 28 is disposed on an upper surface of the bulge 11a at a position biased to the right of a front portion of the fuel tank 11 from a center in the vehicle width direction of the fuel tank 11. The fuel filler port 28 is closed by a removable fuel filler cap 29. The tank cover 19 has a circular through hole 30, through which the fuel filler port 28 and the fuel filler cap 29 are exposed to the outside.

Figure 5:
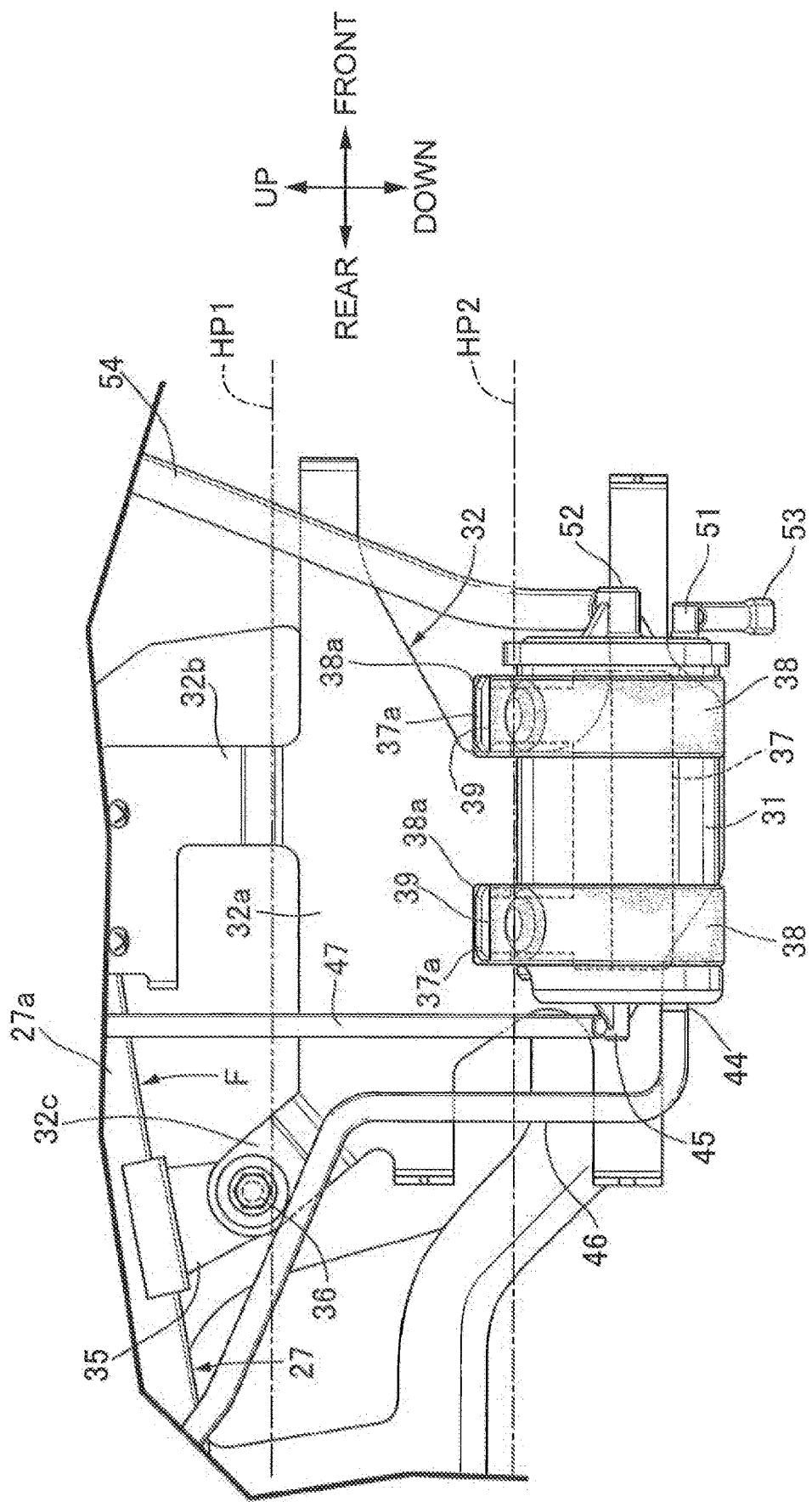
FIG. 5 is an enlarged view of the major part in FIG. 2.

Reference is also made to FIG. 5. Fuel vapor generated in the fuel tank 11 is adsorbed by a canister 31. The canister 31 is supported by the front-portion inclined portion 27a of the frame member 27 on the right via a stay 32 so as to be disposed below the bulge 11a in the fuel tank 11.

The stay 32 is formed to integrally include a stay main portion 32a, a front-portion support arm 32b, and a rear-portion support arm 32c. The stay main portion 32a extends in the vehicle fore-aft direction. The front-portion support arm 32b extends upwardly from an intermediate portion in the fore-aft direction of the stay main portion 32a. The rear-portion support arm 32c extends from a rear portion of the stay main portion 32a obliquely upwardly toward the rear.

The front-portion support arm 32b has a lock hole 33 formed in an upper portion thereof. A lock claw 34 is fixedly provided for the front-portion inclined portion 27a of the frame member 27 on the right. The lock claw 34 engages with the lock hole 33. In addition, a support protrusion 35 is fixedly provided for the front-portion inclined portion 27a of the frame member 27 on the right. The rear-portion support arm 32c has an upper end portion fastened to the support protrusion 35 by a bolt 36.

The canister 31 is supported by the stay 32 under a condition in which a longitudinal direction of the canister 31 extends along the vehicle fore-aft direction. A mounting plate 37 is fixedly attached to a lower portion of the stay main portion 32a in the stay 32. The mounting plate 37 includes a pair of hooks 37a each having a substantial L-shape and formed at an upper portion of the mounting plate 37. The hooks 37a are spaced apart from each other in the vehicle fore-aft direction. Meanwhile, a pair of ring-shaped rubbers 38 is mounted on and surrounds the canister 31. The rubbers 38 each have a protrusion 38a integrally formed therewith. The protrusion 38a has a slit 39 formed therein. The hooks 37a are inserted in the respective slits 39, so that the canister 31 is supported by the stay 32.

The canister 31, when supported by the stay 32, is disposed around the fuel tank 11 at a position lower than a seating portion 15a in the occupant seat 15. That is, the canister 31 is disposed around the fuel tank 11 at a position below a first horizontal plane HP1, which passes through a lowermost portion of the seating portion 15a.

An exhaust muffler 42 configures a downstream end portion of an exhaust system 41 of the internal combustion engine E. The exhaust muffler 42 is disposed between the rear wheels WR at a position below the occupant seat 15. The canister 31 is disposed below a lower end 43a of an exhaust outlet 43. The exhaust outlet 43 is located at a rear end portion of the exhaust muffler 42. That is, the canister 31 is disposed below a second horizontal plane HP2, which passes through the lower end 43a of the exhaust outlet 43.

The canister 31 has end walls 31a and 31b on opposite ends in the longitudinal direction thereof. A charge pipe 44 and a purge pipe 45 are provided in a protruding condition on, out of the end walls 31a and 31b, the end wall 31a, which faces toward the rear in the vehicle fore-aft direction. A charge hose 46, which has one end portion connected to the charge pipe 44, is extended up to a central portion of the fuel tank 11 along a path between the fuel tank 11 and the tank cover 19. In addition, a circular support plate 48 is mounted at a central portion of an upper surface of the fuel tank 11. The support plate 48 supports a fuel pump (not illustrated) disposed inside the fuel tank 11. The charge hose 46 has an other end portion connected with a fuel vapor connection pipe 49. The fuel vapor connection pipe 49 is disposed at the support plate 48 so as to guide the fuel vapor inside the fuel tank 11 and protrudes upwardly.

A purge hose 47 has one end portion connected to the purge pipe 45. The purge hose 47 is extended inside the vehicle body cover 18 toward the internal combustion engine E side and has an other end portion connected with an intake system 50 of the internal combustion engine E (see FIGS. 1 and 2).

A drain pipe 51 is provided in a protruding condition at a lower portion of, out of the end walls 31a and 31b on the opposite ends in the longitudinal direction of the canister 31, the end wall 31b, which faces toward the front in the vehicle fore-aft direction. An outside air introduction pipe 52 is provided in a protruding condition on the end wall 31b so as to be disposed above the drain pipe 51. The outside air introduction pipe 52 prevents purge resistance from increasing as a result of vacuum developing inside the canister 31 during purging of the fuel vapor by the purge hose 47 to the intake system 50.

A removable hermetic sealing cap 53 or a one-way valve that prevents entry of rainwater from the outside is mounted in the drain pipe 51.

The hermetic sealing cap 53 is formed of, for example, rubber and is easily removable. The hermetic sealing cap 53, if having transparency, allows presence or absence of fluid in the drain pipe 51 to be visually checked. The one-way valve may have a simple structure of rubber having a slit therein so as to, while being opened by pressure inside the drain pipe 51, prevent entry of rainwater from the outside.

An outside air introduction hose 54 is connected to the outside air introduction pipe 52. The outside air introduction hose 54 is extended onto an upper surface of the bulge 11a in the fuel tank 11 such that an upstream opening end portion 54a of the outside air introduction hose 54 is disposed around the fuel filler port 28 disposed in the upper portion of the fuel tank 11. A holder 55, which is fixedly attached to the upper surface of the bulge 11a, holds an upstream side end portion of the outside air introduction hose 54. This results in the upstream opening end portion 54a being disposed around the fuel filler port 28 so as to be covered in the tank cover 19 at a position around the through hole 30.

Moreover, the upstream opening end portion 54a of the outside air introduction hose 54 is disposed at a position higher than the seating portion 15a of the occupant seat 15, so that the upstream opening end portion 54a is disposed above a third horizontal plane HP3, which passes through a highest point of the upper surface of the seating portion 15a.

The operation of the first embodiment will be described below. The canister 31 is disposed around the fuel tank 11 at a position lower than the seating portion 15a of the occupant seat 15. The removable hermetic sealing cap 53 or the one-way valve that prevents entry of rainwater from the outside is mounted in the drain pipe 51, which is disposed at the lower portion of the canister 31. Thus, despite the canister 31 being disposed at a position relatively lower in height, entry of rainwater in the canister 31 can be prevented by a simple structure in which the hermetic sealing cap 53 or the one-way valve is mounted in the drain pipe 51 of the canister 31.

The canister 31 includes the outside air introduction pipe 52, which prevents purge resistance from increasing as a result of vacuum developing inside the canister 31 during purging of the fuel vapor to the intake system 50 of the internal combustion engine E, and the outside air introduction hose 54, which is connected with the outside air introduction pipe 52, has the upstream opening end portion 54a disposed at a position higher than the seating portion 15a of the occupant seat 15. Thus, even when the vehicle is used to travel down a flooded road with a deep water depth, the upstream opening end portion 54a of the outside air introduction hose 54 can be disposed at a position higher than the water level, so that steady introduction of outside air to the canister 31 can be achieved and purge performance of the canister 31 can be enhanced.

The exhaust muffler 42, which configures the downstream end portion of the exhaust system 41 of the internal combustion engine E, is disposed at a position below the occupant seat 15, the canister 31 is disposed below the lower end 43a of the exhaust outlet 43 of the exhaust muffler 42, and the upstream opening end portion 54a of the outside air introduction hose 54 is disposed at a position higher than the seating portion 15a of the occupant seat 15. Even with the configuration in which the canister 31 is disposed at an even lower position by being disposed below the lower end 43a of the exhaust outlet 43 of the exhaust muffler 42, which is disposed below the occupant seat 15, the outside air introduction hose 54 has the upstream opening end portion 54a disposed at a high position, so that steady introduction of outside air to the canister 31 can be achieved and purge performance of the canister 31 can be enhanced.

Additionally, the upstream opening end portion 54a of the outside air introduction hose 54 is disposed around the fuel filler port 28, which is disposed in the upper portion of the fuel tank 11. Thus, entry of dust in the fuel filler port 28 and the upstream opening end portion 54a of the outside air introduction hose 54 can be prevented, so that dust-proof performance can be enhanced, while a dust-proof structure for the upstream opening end portion 54a of the outside air introduction hose 54 can be further simplified.

Figure 6:
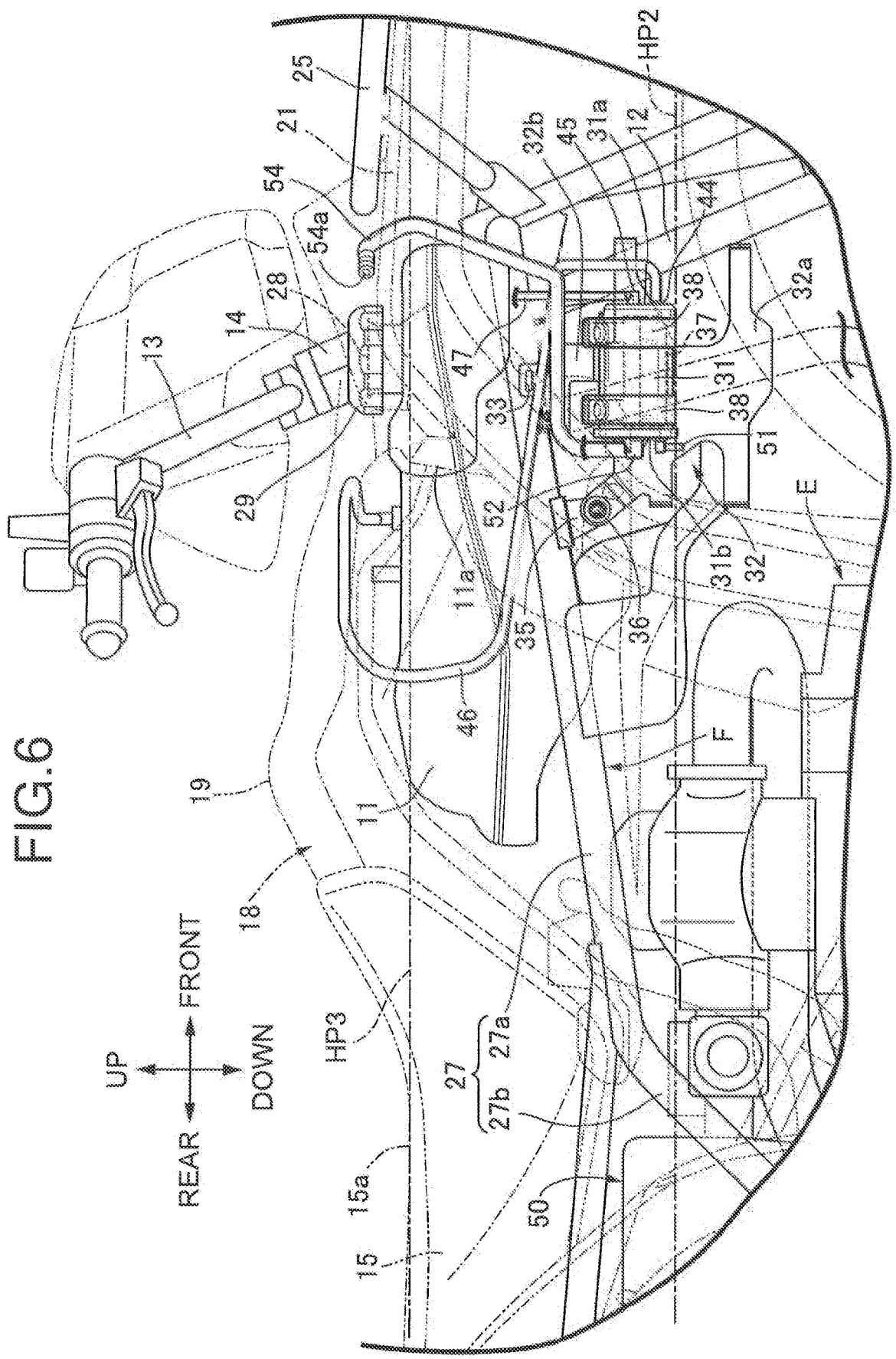
FIG. 6 is a view, corresponding to FIG. 2, of a second embodiment.
Figure 7:
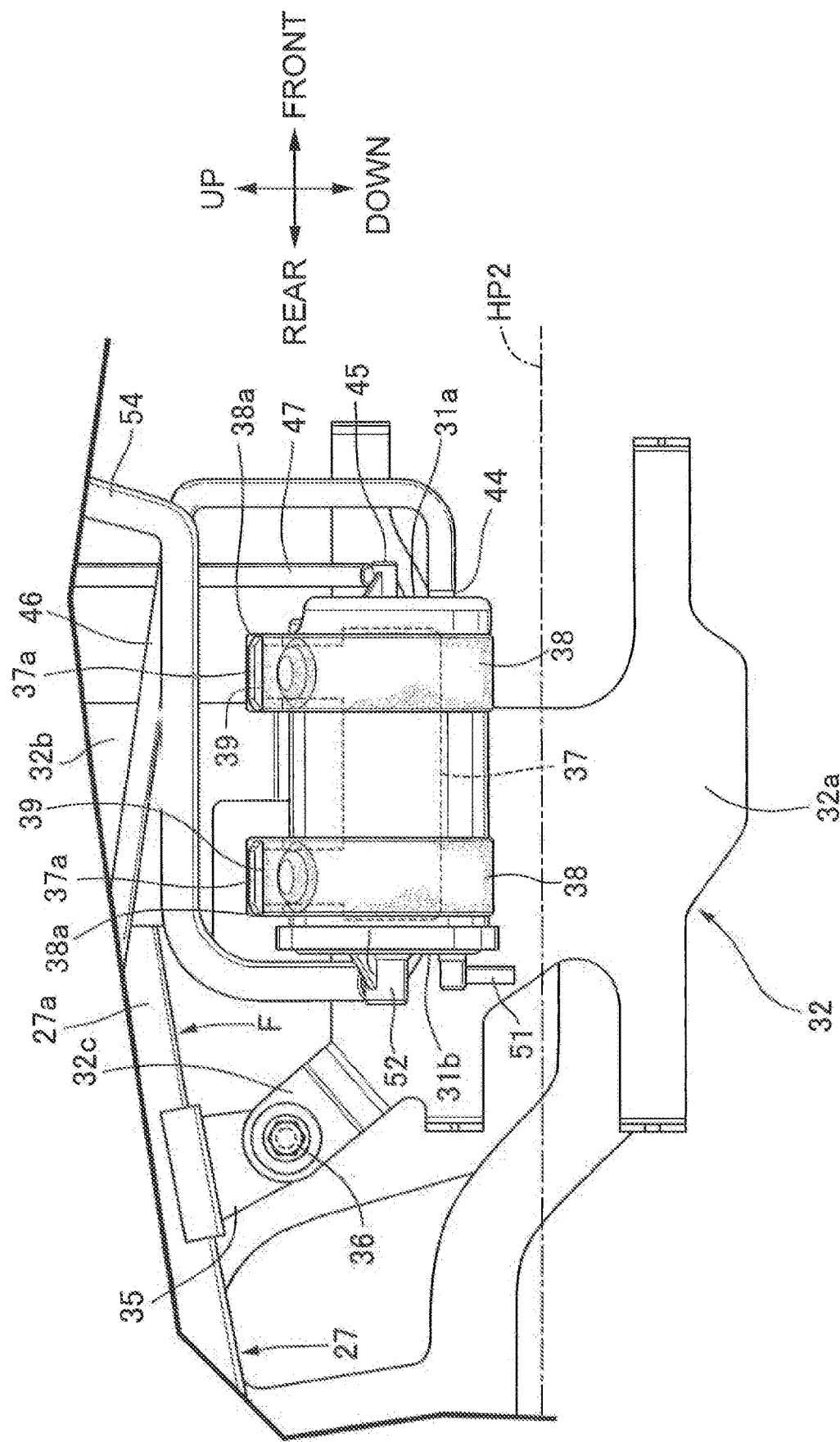
FIG. 7 is an enlarged view of a major part in FIG. 6.

A second embodiment of the present invention will be described below with reference to FIGS. 6 and 7. Like or corresponding parts are identified by the same reference numerals and detailed descriptions for those parts will be omitted.

A canister 31, which adsorbs fuel vapor generated in a fuel tank 11, is disposed on one side in the vehicle width direction of a vehicle body frame F (on the right side in the second embodiment) and disposed below the fuel tank 11. The canister 31 is supported by, out of a pair of left and right frame members 27 configuring part of the vehicle body frame F, the front-portion inclined portion 27a of the frame member 27 on the right via a stay 32. Additionally, a mounting plate 37 is fixedly attached to an upper portion of a stay main portion 32a in the stay 32. The mounting plate 37 has a pair of hooks 37a. A pair of ring-shaped rubbers 38, which are mounted on the canister 31, is supported by the hooks 37a.

The configuration in which the canister 31 is supported at the upper portion of the stay main portion 32a in the stay 32 results in the canister 31 being disposed above a lower end 43a of an exhaust outlet 43 of an exhaust muffler 42, which configures a downstream end portion of an exhaust system 41 of an internal combustion engine E (see the first embodiment). That is, the canister 31 is disposed above a second horizontal plane HP2, which pass through the lower end 43a of the exhaust outlet 43.

The canister 31 has a longitudinal direction extending along the vehicle fore-aft direction and is supported via the stay 32 such that an end wall 31b, on which a drain pipe 51 and an outside air introduction pipe 52 are disposed, faces toward the rear in the vehicle fore-aft direction and an end wall 31a, on which a charge pipe 44 and a purge pipe 45 are disposed, faces toward the front in the vehicle fore-aft direction. The drain pipe 51 is opened directly to the outside while facing downwardly.

A charge hose 46, which is connected to the purge pipe 45, and an outside air introduction hose 54, which is connected to the outside air introduction pipe 52, are disposed so as to cross each other at a position beside the canister 31.

In accordance with the second embodiment, the canister 31 is disposed above the lower end 43a of the exhaust outlet 43 of the exhaust muffler 42 and the drain pipe 51 is opened directly to the outside while facing downwardly. The canister 31 is thus disposed at a position relatively high. This disposition of the canister 31 can avoid rainwater from scattering toward the drain pipe 51 side and a simple structure by which the drain pipe 51 is opened directly to the outside while facing downwardly can prevent rainwater from entering the canister 31.

The charge hose 46, which guides the fuel vapor from the fuel tank 11 to the canister 31, and the outside air introduction hose 54 are disposed so as to cross each other at a position beside the canister 31. The resultant longer length in the charge hose 46 and the outside air introduction hose 54 allows the outside air and the fuel vapor to flow mildly, so that variations in pressure inside the canister 31 can be suppressed and steady emission performance can be maintained.

Additionally, the canister 31 is supported by the vehicle body frame F under a condition in which the longitudinal direction of the canister 31 extends along the vehicle fore-aft direction, the canister 31 is disposed on the right in the vehicle width direction of the vehicle body frame F and below the fuel tank 11, and the drain pipe 51 is disposed on the end wall 31b, which faces toward the rear in the vehicle fore-aft direction, of the canister 31. The foregoing configuration enables an effect to be enhanced of prevention of entry of dust, dirt, muddy water, and the like, which scatter as the vehicle travels, in the drain pipe 51.

Embodiments of the present invention, has been described above, but the present invention is not limited to the above-mentioned embodiments and may be modified in a variety of ways as long as the modifications do not depart from the gist of the present invention.

What is claimed is:

1. A saddled vehicle comprising:
a vehicle body frame that includes a head pipe, disposed at a front end portion of the vehicle body frame, for steerably supporting a steering handlebar;
an internal combustion engine supported at a lower portion of the vehicle body frame;
a fuel tank supported at an upper portion of the vehicle body frame;
a canister that, while adsorbing fuel vapor generated in the fuel tank, can purge the fuel vapor to an intake system of the internal combustion engine, the canister being disposed around the fuel tank at a position lower than a seating portion of an occupant seat; and
a removable hermetic sealing cap that prevents entry of rainwater from an outside, the hermetic sealing cap being included in a drain pipe disposed at a lower portion of the canister.

2. A saddled vehicle comprising:
a vehicle body frame that includes a head pipe, disposed at a front end portion of the vehicle body frame, for steerably supporting a steering handlebar;
an internal combustion engine supported at a lower portion of the vehicle body frame;
a fuel tank supported at an upper portion of the vehicle body frame;
a canister that, while adsorbing fuel vapor generated in the fuel tank, can purge the fuel vapor to an intake system of the internal combustion engine, the canister being disposed around the fuel tank at a position lower than a seating portion of an occupant seat; and
a removable hermetic sealing cap or a one-way valve that prevents entry of rainwater from an outside, the hermetic sealing cap or the one-way valve being included in a drain pipe disposed at a lower portion of the canister,
wherein an outside air introduction pipe is provided at the canister, said outside air introduction pipe preventing purge resistance from increasing as a result of vacuum developing inside the canister during purging of the fuel vapor to the intake system, and
wherein an outside air introduction hose connected with the outside air introduction pipe has an upstream opening end portion disposed at a position higher than the seating portion of the occupant seat.

3. The saddled vehicle according to claim 2, wherein an exhaust muffler that configures a downstream end portion of an exhaust system of the internal combustion engine is disposed below the occupant seat,
wherein the canister is disposed below a lower end of an exhaust outlet of the exhaust muffler, and
wherein the upstream opening end portion of the outside air introduction hose is disposed at a position higher than the seating portion of the occupant seat.

4. The saddled vehicle according to claim 2, wherein the upstream opening end portion of the outside air introduction hose is disposed around a fuel filler port disposed in an upper portion of the fuel tank.

5. The saddled vehicle according to claim 3, wherein the upstream opening end portion of the outside air introduction hose is disposed around a fuel filler port disposed in an upper portion of the fuel tank.

* * * * *